US010255736B2

(12) United States Patent
Kuruba et al.

(10) Patent No.: US 10,255,736 B2
(45) Date of Patent: Apr. 9, 2019

(54) SYSTEM AND METHOD TO ACCESS/RESTRICT A SECURITY SYSTEM FOR TEMPORARY USERS USING A MOBILE APPLICATION

(71) Applicant: Honeywell International Inc., Morristown, NJ (US)

(72) Inventors: Suhasini Kuruba, Banagalor (IN); Shanmuga Prabhu M, Kumbakonam (IN); Hemanth Pv, Bangalore (IN)

(73) Assignee: ADEMCO INC., Golden Valley, MN (US)

( * ) Notice: Subject to any disclaimer, the term of this patent is extended or adjusted under 35 U.S.C. 154(b) by 565 days.

(21) Appl. No.: 14/256,010

(22) Filed: Apr. 18, 2014

(65) Prior Publication Data

US 2015/0302674 A1 Oct. 22, 2015

(51) Int. Cl.
G07C 9/00 (2006.01)
H04W 12/08 (2009.01)
H04W 4/12 (2009.01)
H04L 29/06 (2006.01)
H04W 12/04 (2009.01)

(52) U.S. Cl.
CPC ..... *G07C 9/00142* (2013.01); *G07C 9/00039* (2013.01); *G07C 9/00103* (2013.01); *G07C 9/00166* (2013.01); *H04W 12/08* (2013.01); G07C 9/00111 (2013.01); H04L 63/0838 (2013.01); H04L 63/107 (2013.01); H04L 63/108 (2013.01); H04W 4/12 (2013.01); H04W 12/04 (2013.01)

(58) Field of Classification Search
None
See application file for complete search history.

(56) References Cited

U.S. PATENT DOCUMENTS 4,532,507 A    7/1985  Edson et al.
4,532,783 A *  8/1985  Maurice .............. E05B 19/0005
                                                    70/162
(Continued)

FOREIGN PATENT DOCUMENTS

CA    2 247 600 A1    3/2000
CN    1086284          5/1994
(Continued)

OTHER PUBLICATIONS

Extended European search report from corresponding EP patent application 15248002.6, dated Sep. 14, 2015.
(Continued)

*Primary Examiner* — Chico A Foxx
(74) *Attorney, Agent, or Firm* — Husch Blackwell LLP

(57) ABSTRACT

An apparatus that includes a mobile wireless device of an authorized person receiving an identifier of another person who is to be granted temporary access into a secured geographic area of the authorized person by a security system of the authorized person, a processor of the mobile device or the security system generating a temporary access code with specific features that is to be used by the other person for gaining entry into the secured area and the mobile device of the authorized person transferring the temporary password to a mobile wireless device of the other person.

14 Claims, 4 Drawing Sheets

Solution Implemented

1. Guest at your door-steps
2. User in office, don't want to share his user code
3. User creates a temporary user code using mobile application and send the same to user mobile automatically
4. Guest receive SMS from the user with user code details

(56) References Cited

U.S. PATENT DOCUMENTS

| | | | | |
|---|---|---|---|---|
| 4,802,353 | A | * | 2/1989 | Corder ................. E05B 47/0661 70/277 |
| 5,475,377 | A | * | 12/1995 | Lee ......................... G06F 21/35 340/5.9 |
| 6,928,558 | B1 | * | 8/2005 | Allahwerdi ............. G06F 21/31 713/172 |
| 7,113,090 | B1 | * | 9/2006 | Saylor .............. G08B 13/19682 340/5.33 |
| 7,302,570 | B2 | * | 11/2007 | Beard ..................... G06F 21/33 713/155 |
| 7,778,627 | B2 | * | 8/2010 | Badt, Jr. ................. H04L 63/10 455/410 |
| 8,120,460 | B1 | * | 2/2012 | Zhu ........................ B60R 25/24 340/5.1 |
| 8,350,694 | B1 | * | 1/2013 | Trundle ................. G08B 25/08 340/539.11 |
| 8,675,071 | B1 | * | 3/2014 | Slavin .................... H04M 11/04 348/143 |
| 8,682,245 | B2 | * | 3/2014 | Fyke .................. G07C 9/00015 455/41.1 |
| 8,756,431 | B1 | * | 6/2014 | Despain ................ G06F 21/305 713/155 |
| 9,109,379 | B1 | * | 8/2015 | Ranchod ................ E05B 67/00 |
| 9,275,208 | B2 | * | 3/2016 | Protopapas ............. G06F 21/31 |
| 2003/0018724 | A1 | * | 1/2003 | Mathewson, II .... G06Q 10/109 709/206 |
| 2004/0212503 | A1 | * | 10/2004 | Stilp .................... G06K 7/0008 340/572.1 |
| 2005/0059418 | A1 | * | 3/2005 | Northcutt ........ H04M 1/274516 455/517 |
| 2005/0066049 | A1 | * | 3/2005 | Clevy ............... H04L 29/06027 709/231 |
| 2007/0032221 | A1 | * | 2/2007 | Badt, Jr. ................. H04L 63/10 455/410 |
| 2008/0088437 | A1 | * | 4/2008 | Aninye ............... G07C 9/00111 340/539.13 |
| 2009/0241055 | A1 | * | 9/2009 | Augustine .............. G06Q 10/06 715/781 |
| 2009/0249076 | A1 | * | 10/2009 | Reed ....................... G06Q 30/00 713/181 |
| 2011/0099612 | A1 | | 4/2011 | Lee et al. |
| 2012/0075059 | A1 | * | 3/2012 | Fyke ........................ G06F 21/35 340/5.21 |
| 2012/0077431 | A1 | * | 3/2012 | Fyke .................. G07C 9/00015 455/41.1 |
| 2012/0110677 | A1 | * | 5/2012 | Abendroth .......... G06F 21/6254 726/26 |
| 2013/0043973 | A1 | * | 2/2013 | Greisen .............. G07C 9/00571 340/5.51 |
| 2013/0049928 | A1 | * | 2/2013 | Moore ................... G07C 11/00 340/5.51 |
| 2013/0262275 | A1 | * | 10/2013 | Outwater ............... G06Q 10/02 705/27.1 |
| 2014/0012655 | A1 | * | 1/2014 | Polak ..................... G06Q 30/02 705/14.39 |
| 2014/0118107 | A1 | * | 5/2014 | Almomani ......... G07C 9/00309 340/5.22 |
| 2014/0266573 | A1 | * | 9/2014 | Sullivan ............. G07C 9/00571 340/4.32 |
| 2014/0310788 | A1 | * | 10/2014 | Ricci ....................... B60Q 1/00 726/6 |
| 2014/0334684 | A1 | * | 11/2014 | Strimling ........... G06K 9/00771 382/105 |
| 2015/0067792 | A1 | * | 3/2015 | Benoit .................. H04W 12/04 726/5 |
| 2015/0332531 | A1 | * | 11/2015 | Davidsson ......... G07C 9/00182 70/256 |

FOREIGN PATENT DOCUMENTS

| | | |
|---|---|---|
| CN | 1909454 A | 2/2007 |
| EP | 1 154 365 A1 | 11/2001 |
| GB | 2 372 126 A | 8/2002 |
| WO | 02/08551 A1 | 1/2002 |
| WO | WO 2014/031563 A2 | 2/2014 |

OTHER PUBLICATIONS

Examination report from corresponding EP patent application 15248002.6, dated Jul. 21, 2017.
First Office Action and Search Report for corresponding CN patent application 201510182871.4, dated Jul. 26, 2017.
English-language translation of First Office Action and Search Report for corresponding CN patent application 201510182871.4, dated Jul. 26, 2017.
English-language translation of Abstract for CN patent publication 1909454, dated Feb. 2, 2007.

* cited by examiner

Proposed Mobile application message to the user

- Message send to Guest user mobile as following:

```
                                                    ┌─200
Name                           :JOHN
User Code                      :5678
House Address                  :H. No 44, 1st main
                                M.G. Road, Bangalore
User Code Expiry Start date & time  :11/01/2013 09:00 AM
User Code Expiry End date & time    :11/15/2013 07:30 PM
Number of Disarms permitted    :10
```

*FIG. 4*

SYSTEM AND METHOD TO ACCESS/RESTRICT A SECURITY SYSTEM FOR TEMPORARY USERS USING A MOBILE APPLICATION

FIELD

This application relates to security systems and more particularly to methods of accessing security systems.

BACKGROUND

Systems are known for the protection of secured areas. Such systems typically include one or more sensors that detect threats within the secured area. A local audible alarm may also be provided to notify occupants present within the secured area of detected threats.

Threats detected by such systems may include any event that threatens the health and/or safety of human occupants or assets. An example of a threat to human occupants may include toxic gas. Other threats to the safety of occupants and/or assets may include fire, explosion or unauthorized intruders.

In general, a security system may include a control panel that monitors each of the sensors within the secured area. Where the security system is used within a home, the control panel may include a number of operational states including armed away, disarmed, armed stay, etc. A user interface may be located within the secured area and be used by an occupant of the secured area to individually select each of the operational states.

In each of the states, a processor of the control panel may monitor a respective set of sensors for activation. Upon activation of any of the sensors, the processor may send an alarm message to a central monitoring station.

While such systems work well, they are not very flexible. For example, if a service person must enter a person's home, then the person must deactivate the alarm and leave the home unprotected for the duration of a visit. Alternatively, the person must give the service person, his/her access code. However, this leaves the person vulnerable if the service person should later give the access code to a criminal. Accordingly, a need exists for more flexible and confident methods of controlling security systems.

BRIEF DESCRIPTION OF THE DRAWINGS

FIG. 4 depicts a message that may be displayed on the mobile device of a recipient of a temporary password.

DETAIL DESCRIPTION

Figure 1:
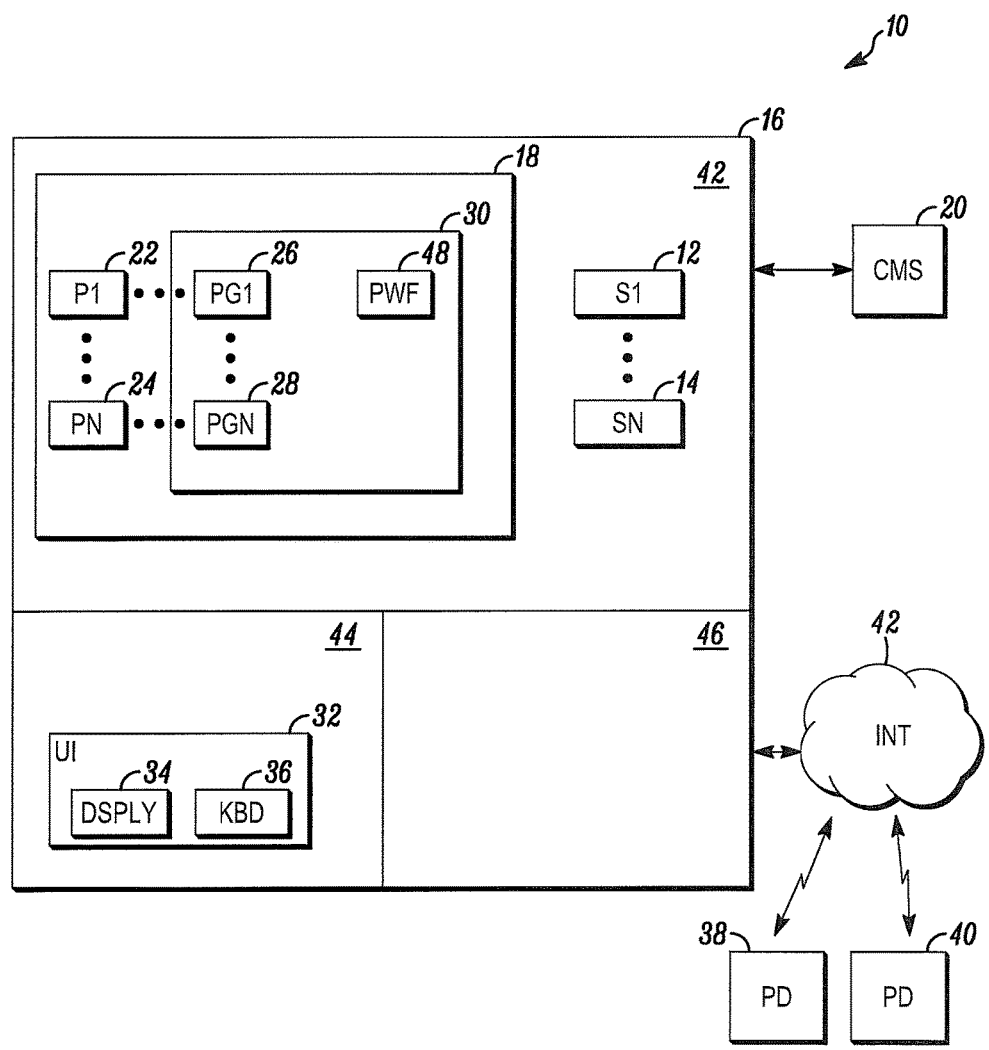
FIG. 1 illustrates a block diagram of a security system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a simplified block diagram of a security system 10 shown generally in accordance with an illustrated embodiment. The security system may include a number of sensors 12, 14 that detect threats within a secured area (e.g., a home, a business, etc.) 16.

The sensors may be based upon any of a number of different detection technologies. For example at least some of the sensors may be limit switches placed on the doors and windows that provide access to and egress from the secured area. Other sensors may be fire and/or smoke detectors that detect environmental threats.

The sensors may be monitored by an alarm control panel 18. The control panel may be located within the secured area, as shown in FIG. 1, or may be located remotely from the secured area. Upon detecting activation of one of the sensors, the control panel may compose and send an alarm message to a central monitoring station 20. The alarm message may include an identifier of the alarm system (e.g., account number, address, etc.), an identifier of the sensor, the type of sensor and a time). The central monitoring station may decode the alarm message and respond by summoning the appropriate help (e.g., police, fire department, etc.).

The alarm system may also include a user interface 32. The user interface may be used by an authorized user to arm and disarm the security system.

The user interface may include a display 34 and a keyboard 36. Alternatively, the user interface may use a touchscreen display that combines the display and keyboard functions.

The alarm system may also be adapted to accept instructions from a number of portable wireless devices 38, 40. The portable wireless devices may interact with the control panel via the Internet 42.

Located within the alarm panel and portable devices may be one or more processor apparatus (processors) 22, 24, each operating under control of one or more computer programs 26, 28, loaded from a non-transitory computer readable medium (memory) 30. As used herein, reference to a step performed by a computer program is also reference to the processor that executed that step.

During normal operation, a status processor of the alarm panel may monitor the user interface for control instructions. For example, an authorized user may enter a personal identification number (PIN) followed by activation of a function key to change a monitoring state of the alarm system. By entering a PIN number followed by activation of an alarm away, the user may activate the alarm system for periods while the user is away from home. In response, an alarm processor may monitor each of the sensors for activation and report events to the central monitoring station. Upon returning home, the user may enter his/her PIN followed by activation of the disarm key to disarm the system.

Alternatively, the user may activate the alarm stay key while the user is at home. In the armed stay mode, the alarm processor may fire sensors and only intrusion sensors along a periphery of the home.

In this regard, a graphical user interface (GUI) processor may provide an interface between the user interface and alarm panel. For example, the GUI processor may present an icon representing each of the functional aspects of the alarm system (e.g., arm, disarm, alarm away, etc.) on the user interface. Upon activating one of the function keys that GUI processor may display a window requesting entry of a PIN. Upon entry of the correct identification information, the GUI processor may activate or deactivate the alarm processor.

The GUI processor may also present one or more icons that selectively activate and deactivate portions of the secured area. For example, the secured area may include a number of different portions or subareas 42, 44, 46. These areas may be separately protected via activation of the appropriate icon.

The GUI processor may also provide an interface between the alarm panel and a portable device (e.g., device 38) of an authorized user. In this regard, a corresponding GUI processor within the portable device may provide an interface of a display of the portable device that emulates the display on the user interface within the secured area.

Under an illustrated embodiment, the portable wireless device of authorized user may also include a temporary password function that allows the authorized user to grant temporary passwords for use by other parties who would not otherwise be granted access into the secured area without triggering an alarm. For example, if the authorized user is a homeowner, then it would be convenient if the user could grant temporary passwords that could be used by a plumber to perform emergency repairs within the home of the homeowner. It would also be convenient if the passwords could be automatically transmitted to the other party in a secure manner with a number of use restrictions.

Figure 2:
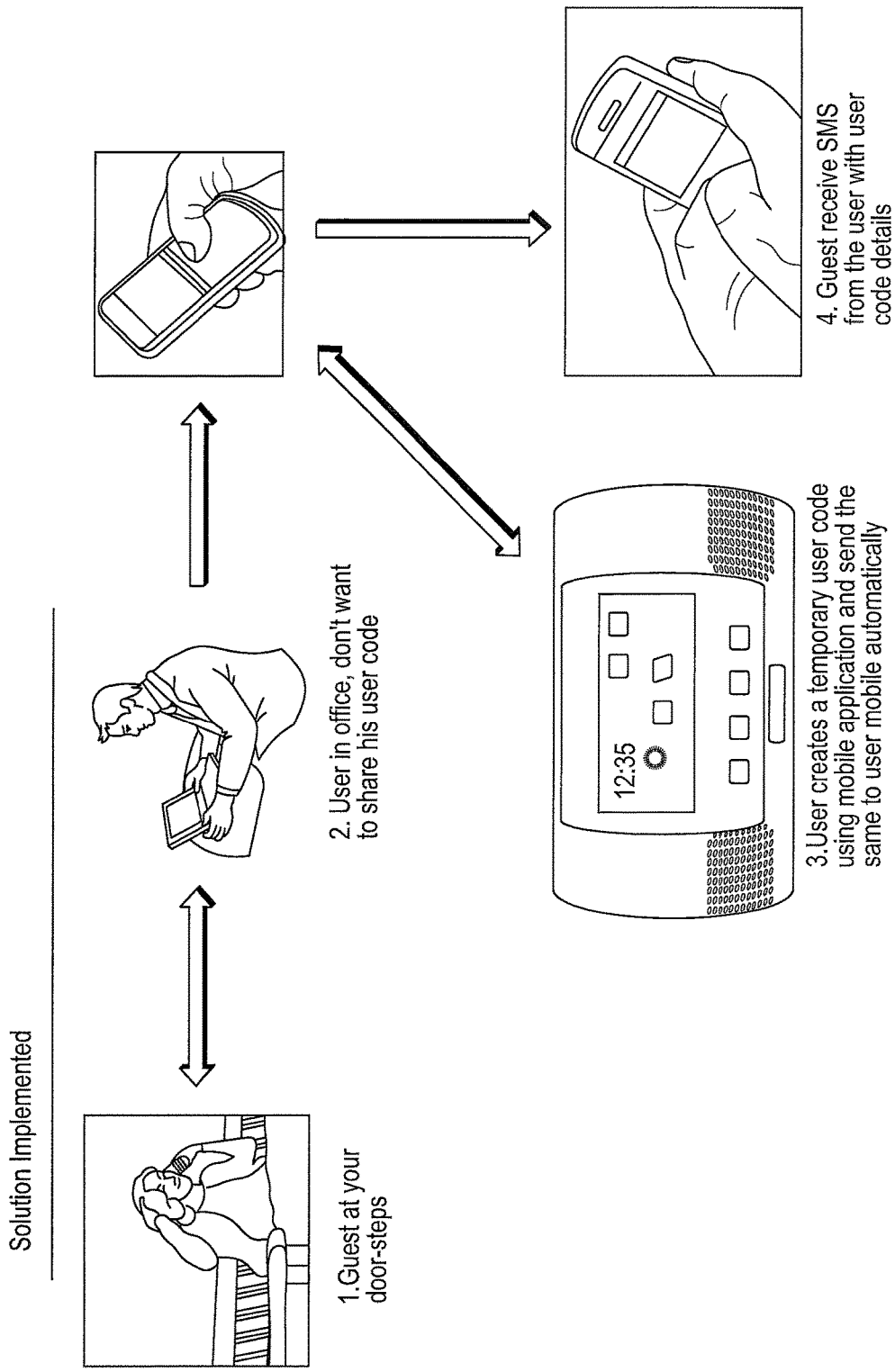
FIG. 2 depicts a set of process steps that may be used by the system of FIG. 1.

FIG. 2 depicts an example of the use of the temporary password function under one illustrated embodiment. As shown, a guest may arrive on the doorstep of a homeowner and the homeowner may not want to share his/her use code. In response, the user may activate a temporary password function on his/her portable device (e.g., smartphone) that automatically generates a temporary password. The password is automatically transferred to the alarm panel and to the portable device (e.g., device 40) of the guest.

In this regard, the user may activate a temporary password icon on his/her portable device. In response, a password processor may confirm the identity of the user and operate to create a temporary password for use by another party with an appropriate set of restrictions on use.

Figure 3:
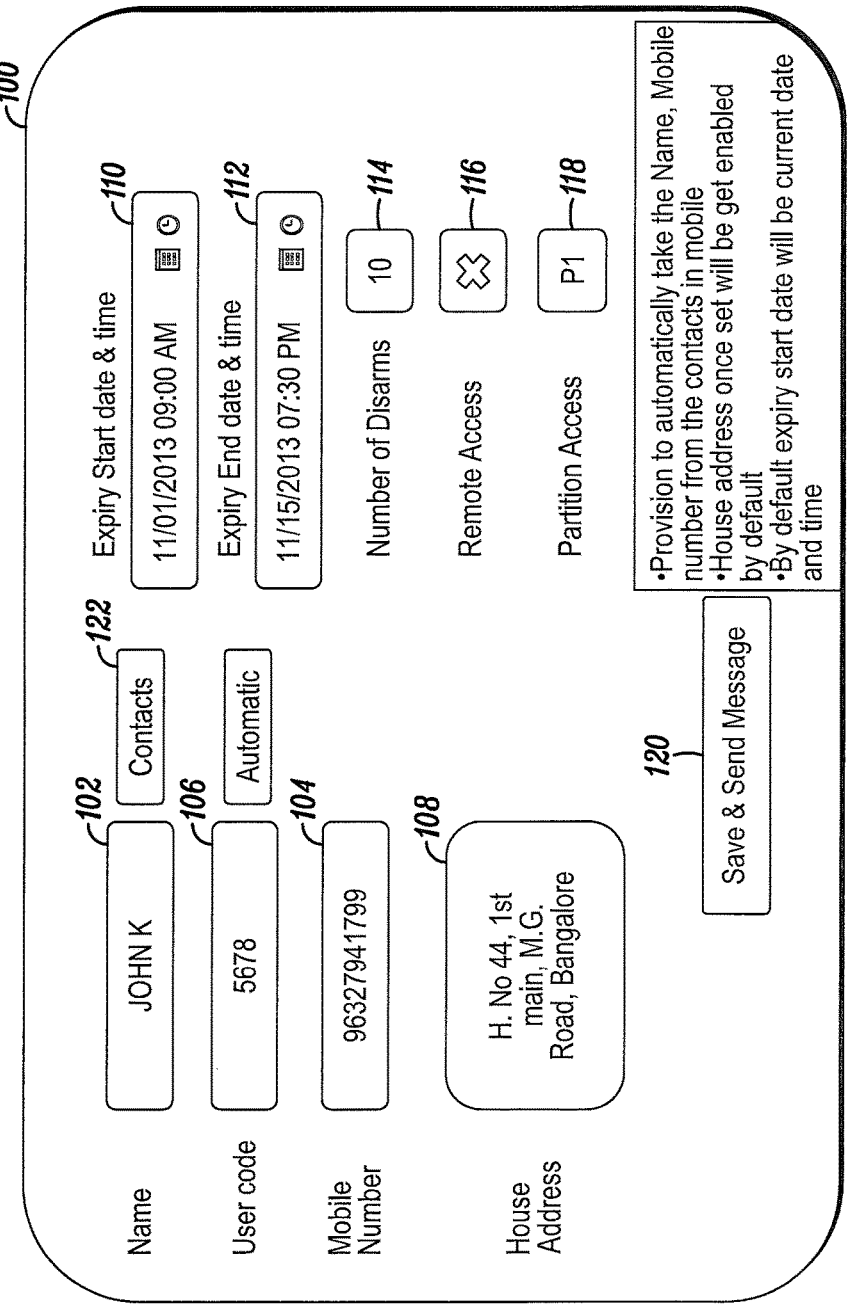
FIG. 3 depicts a screen that the system of FIG. 1 may display on a mobile device.

FIG. 3 depicts an interactive window 100 that the password processor may present on the display of the portable device. In this regard, the user may enter a name of the other person in a first window 102 and a telephone number of the other portable device in a second window 104.

If the attempt is a first for a user, then the user will be asked to provide the address of the secured area in an address window 108. Otherwise, the home address may be retrieved from a default information file 48 within the alarm panel or within the portable device.

The user may also be asked to provide a starting time for the temporary password in a starting time window 110 and an ending time for the password in an ending time window 112. If the user does not enter a time in the starting time window, then the processor may use a current time and date as a default value The user may also be asked to enter a maximum number of disarms that will be allowed for the temporary password. If the guest only has reason to enter the premises once per day, then the maximum number of disarms may be equal to the number of days before the expiration date.

If the guest is only to be allowed entry into part of the secured area, then the user will activate a partition access softkey 118. In response, a set of identifiers of portions of the secured area will be presented on a menu. This may be important in the case where the guest is a contractor who will only be allowed to do work in the kitchen of a home. In this case, only the front door of the home may be disarmed while motion detectors in bedroom areas or a basement will remain active.

Similarly, remote access will normally not be allowed via another checkbox button (push button) 116. This is the case because a guest would not be allowed to remotely disarm the security system using a web application or a mobile application. Again, this is up to the authorized user to enable or disable this option.

In general, one or more processors within the portable device of the authorized user will provide the temporary password function. Under one embodiment, the password processor may be located within the alarm panel and access may be provided through the GUI processor. Alternatively, the processors of the temporary password function may be shared between the alarm panel and portable device of the authorized user. For example, the temporary password may be generated within the alarm processor by a random number generator processor and transferred to the portable device. Otherwise the temporary password may be generated within the portable device and transferred to the alarm panel.

In either case, once the temporary password and use limitations have been provided, the authorized user may activate a save and send button 120. In response, the password processor may compose a message incorporating the information into an appropriate format (e.g., SMS) and send the message to the portable device of the other user and to the alarm panel in the case where the password is independently generated within the portable device.

FIG. 4 is an example of the temporary password message that may be delivered to the other user under the embodiment. As shown, the message may include a name of the other party, the password, the address of the secured area, the beginning and expiration time of the temporary password and the maximum number of times the system can be disarmed.

In general, the temporary password system offers a number of advantages. First, the system automatically generates a valid user code (password) with a valid expiry date and time. Second, the authorized user has the option of granting or denying remote access permission. Normally, the user would not grant permission for remote access.

Third, the user may place a restriction on the number of disarms. This may be important for a contractor who promises to do some particular project but doesn't know when he/she will be able to do it. If the contractor indicates that he/she can do the project in a single day, then the user can set the maximum number of disarms to 1. Since the status processor of the alarm system saves the time and date of each use of the temporary password, the alarm system provides evidence of when the work was performed.

Fourth, the system has the ability to automatically add existing user details, such as the name or mobile telephone number of a frequently used vendor from the contact list of the mobile. The user may access the contact list by activating a contact list button 122 on the display and select one of the contacts.

Fifth, the address for use of the temporary password may be a default value. The user may change the default address if he/she has another (vacation) home with a security system and want to grant access to the second home.

Sixth, the temporary password is automatically sent to the other user. This avoids errors in transcription.

Finally, the alarm panel and system may be armed automatically based upon use of the temporary password and at the end of the expiry date and time. This may be important where the guest is only to be allowed access during daylight hours. This allows the security system to be automatically armed at dusk after expiration of the password for the day.

In general, the system includes a mobile wireless device of an authorized person receiving an identifier of another person who is to be granted temporary access into a secured geographic area of the authorized person by a security system of the authorized person, a processor of the mobile device or the security system generating a temporary access code that is to be used by the other person for gaining entry into the secured area and the mobile device of the authorized person transferring the temporary password to a mobile wireless device of the other person.

The system may also include a mobile wireless device of an authorized person with a user interface that receives an identifier of another person who is to be granted temporary access into a secured geographic area of the authorized person by a security system of the authorized person, a processor of the mobile device or the security system that generates a temporary access code that is to be used by the other person for gaining entry into the secured area and the mobile device of the authorized person that transfers the temporary password to a mobile wireless device of the other person.

The system may also include a security system that protects a secure geographic area, a mobile wireless device of an authorized person that is coupled to the security system, the mobile device receives an identifier of another person through a user interface of the wireless device who is to be granted temporary access into the secured geographic area of the authorized person by a security system of the authorized person, a processor of the mobile device or the security system that generates a temporary access code that is to be used by the other person for gaining entry into the secured area and a processor of the mobile device of the authorized person that transfers the temporary password to a mobile wireless device of the other person along with a set of limitations where the set of limitations further includes one or more of a start date and time, an ending date and time and a maximum number of disarm events.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be added to, or removed from the described embodiments.

The invention claimed is:

1. A method comprising:
a first processor of a security system monitoring a secured geographic area and storing a first access password, wherein the first access password is entered into a user interface of the security system by an authorized person to disarm the security system;
a first mobile wireless device of the authorized person receiving an identifier of a second person who is to be granted temporary access into the secured geographic area by the security system;
a second processor of the first mobile wireless device of the authorized person or the first processor of the security system generating a temporary access password that is to be used by the second person to disarm the security system by entering the temporary access password into the user interface of the security system, wherein the temporary access password includes a limits use parameter, and wherein the limits use parameter includes a start date, a start time, an end date, and an end time that limit use of the temporary access password such that the temporary access password is valid only after the start date and the start time and before the end date and the end time;
the first mobile wireless device of the authorized person transferring the temporary access password to a second mobile wireless device of the second person; and
the first processor of the security system automatically arming the security system at the end time on the end date,
wherein the first access password is different than the temporary access password.

2. The method as in claim 1 further comprising the second processor of the first mobile wireless device of the authorized person transferring a house address of the authorized person to the second mobile wireless device of the second person.

3. The method as in claim 1 further comprising a user input of the first mobile wireless device of the authorized person receiving the limits use parameter from the authorized person.

4. The method as in claim 1 further comprising the first processor of the security system retrieving a default value for the limits use parameter from a memory of the security system.

5. The method as in claim 1 further comprising the first processor of the security system limiting the use of the temporary access password to a predetermined portion of the secured geographic area.

6. The method as in claim 1 wherein the limits use parameter includes a maximum number of disarms allowed for the use of the temporary access password.

7. An apparatus comprising:
a first processor of a security system that monitors a secured geographic area and that stores a first access password, wherein the first access password is entered into a first user interface of the security system by an authorized person to disarm the security system;
a first mobile wireless device of the authorized person with a second user interface that receives an identifier of a second person who is to be granted temporary access into the secured geographic area by the security system; and
a second processor of the first mobile wireless device of the authorized person,
wherein the second processor of the first mobile wireless device of the authorized person or the first processor of the security system generates a temporary access password to disarm the security system by entering the temporary access password into the first user interface of the security system and transfers the temporary access password to a second mobile device of the second person,
wherein the temporary access password includes a set of limitations on use of the temporary access password,
wherein the set of limitations includes a start date, a start time, an end date, and an end time that limit the use of the temporary access password such that the temporary access password is valid only after the start date and the start time and before the end date and the end time,
wherein the first processor of the security system automatically arms the security system at the end time on the end date, and
wherein the first access password is different than the temporary access password.

8. The apparatus as in claim 7 wherein the second processor of the first mobile wireless device of the authorized person transfers a house address of the authorized person to the second mobile device of the second person.

9. The apparatus as in claim 7 wherein the second user interface of the first mobile wireless device of the authorized person receives the set of limitations on the use of the temporary access password from the authorized person.

10. The apparatus as in claim 7 wherein the second processor of the first mobile wireless device of the authorized person retrieves default values for the set of limitations on the use of the temporary access password from a file within a memory of the first mobile wireless device of the authorized person.

11. The apparatus as in claim 7 wherein the first processor of the security system limits the use of the temporary access password to a predetermined portion of the secured geographic area.

12. The apparatus as in claim 7 wherein the first processor of the security system generates the temporary access password.

13. The apparatus as in claim 7 wherein the set of limitations includes a maximum number of disarms allowed for the use of the temporary access password.

14. An apparatus comprising:
a security system of an authorized user that protects a secured geographic area;
a first processor of the security system that stores a first access password, wherein the first access password is entered into a first user interface of the security system by the authorized user to disarm the security system;
a first mobile wireless device of the authorized user that is coupled to the security system, wherein the first mobile wireless device of the authorized user receives, through a second user interface of the first mobile wireless device of the authorized user, an identifier of a second person who is to be granted temporary access into the secured geographic area by the security system; and
a second processor of the first mobile wireless device of the authorized user,
wherein the second processor of the first mobile wireless device of the authorized user or the first processor of the security system generates a temporary access password that is to be used by the second person to disarm the security system by entering the temporary access password into the first user interface of the security system,
wherein the second processor of the first mobile wireless device of the authorized user transfers the temporary access password and a set of limitations to a second mobile wireless device of the second person,
wherein the second processor of the first mobile wireless device of the authorized user receives an input from the authorized user setting parameters defining the set of limitations,
wherein the set of limitations includes a start date, a start time, an ending date, and an ending time such that the temporary access password is valid only after the start date and the start time and before the ending date and the ending time,
wherein the first processor of the security system automatically arms the security system at the end time on the end date, and
wherein the first access password is different than the temporary access password.

* * * * *